United States Patent
Hancock et al.

(10) Patent No.: US 8,378,619 B2
(45) Date of Patent: Feb. 19, 2013

(54) MOTOR START CIRCUIT FOR AN INDUCTION MOTOR

(75) Inventors: Phil Hancock, Greenhill (AU); Phil Tracy, Epping (AU); Justin Langman, Oakden (AU); Mark Potter, Golden Grove (AU)

(73) Assignee: Hendon Semi Conductors Pty Ltd, Hendon (AU)

( * ) Notice: Subject to any disclaimer, the term of this patent is extended or adjusted under 35 U.S.C. 154(b) by 381 days.

(21) Appl. No.: 12/825,964

(22) Filed: Jun. 29, 2010

(65) Prior Publication Data

US 2011/0001450 A1 Jan. 6, 2011

(30) Foreign Application Priority Data

Jul. 2, 2009 (AU) .............................. 20099030804

(51) Int. Cl.
*H02P 1/42* (2006.01)

(52) U.S. Cl. ........ 318/786; 318/727; 318/788; 318/794; 318/795; 318/796

(58) Field of Classification Search .................. 318/245, 318/609, 701, 721, 727, 753, 754, 755, 778, 318/779, 784, 785, 786, 789, 793, 794, 795, 318/799, 801, 814; 388/812, 839
See application file for complete search history.

(56) References Cited

U.S. PATENT DOCUMENTS

| | | | | |
|---|---|---|---|---|
| 4,745,347 A | * | 5/1988 | Wrege et al. .................. | 318/744 |
| 4,804,901 A | * | 2/1989 | Pertessis et al. .............. | 318/786 |
| 5,017,853 A | * | 5/1991 | Chmiel .......................... | 318/786 |
| 5,296,795 A | * | 3/1994 | Dropps et al. ................ | 318/778 |
| 6,570,778 B2 | * | 5/2003 | Lipo et al. ...................... | 363/41 |

* cited by examiner

*Primary Examiner* — Antony M Paul
(74) *Attorney, Agent, or Firm* — Renner Kenner Greive Bobak Taylor & Weber (57) ABSTRACT

A motor start circuit for an induction motor includes a start switch device serving the purpose of interrupting the current or voltage flow through the start winding after the start of the motor. The motor includes a main winding and a start winding, which are supplied with alternating current or voltage from a mains power supply.

15 Claims, 8 Drawing Sheets

MOTOR START CIRCUIT FOR AN INDUCTION MOTOR

TECHNICAL FIELD

This present invention relates to a motor start circuit for an induction motor with a main winding and a start winding, which are supplied with alternating current or voltage from a mains power supply, and with a start switch device serving the purpose of interrupting the current or voltage flow through the start winding after the start of the motor.

BACKGROUND ART

Single phase induction motors require an arrangement to generate a rotating magnetic field and produce a rotational torque to accelerate the motor towards its running speed. A common arrangement uses a start or starting winding in the motor spaced at an angle to the main winding and in which a starting current, displaced in phase from the main winding current, is arranged to flow during acceleration to operating speed.

The start winding is usually arranged to operate with a current that leads the current in the main winding and that current lead may be achieved by designing the winding to be inherently more resistive than the main (inductive) winding [ie. resistive start] or by connecting a capacitor in series with that winding to control the phase shift and achieve even stronger starting torques [ie. capacitive start]. In motors having a start winding designed to be disconnected once the motor has reached a designed speed this intermittent operation allows this winding to have an increased short-term power rating and reduced manufacturing cost.

As the person skilled in the art would know there are arrangements for achieving the disconnection once a certain speed has been reached, usually at around 80% of synchronous speed, and for reconnecting it again if the motor slows.

Purely mechanical (centrifugal) switches are still in use today (U.S. Pat. No. 4,658,196). Electromechanical switches (relays) (U.S. Pat. No. 3,624,470) with their coils directly energized by the motor winding currents or voltages have also been used. The main problem with all mechanical solutions is reliability. Since the switching currents are quite large, mechanical contacts will always have a limited life.

Because relay coils designed for operation on AC are relatively expensive to produce, and have large spreads in their characteristics, more precise control can be obtained using relays with DC coils.

Other examples like rectified AC signals as well as the use of various rotational speed transducers, typically responsive to magnetic or optical signals are known by the person skilled in the art. The transducer signals, truly proportional to the motor speed are processed to yield a simple on/off drive to the DC relay.

Again there have been many arrangements described for electronically processing the basic motor winding currents or voltages to achieve greater precision than possible using relays directly energized by these signals.

The availability of solid-state switches in the 60s enabled the replacement of the mechanical switch contacts, which were subject to arcing and mechanical wear-out, by triacs or related semiconductor devices.

Continual refinement and cost reduction in motor design has seen a corresponding requirement for precision in the speed of operation in controlling the start winding. Existing arrangements using electronic sensing and a solid-state switch have response time limitations and the objective of this invention is to achieve an arrangement that is still simple and inexpensive yet achieves the very fast and precise control of the motor speed at which the switching of the start winding will occur.

It becomes important to recognize that the motor parameters and supply reference signals being monitored are all AC signals, predominantly sinusoidal in shape, having as their fundamental the AC mains frequency.

Whenever such AC voltage or current signals are being referenced in prior art it is important to understand that it is necessary to specify whether the reference is, for example, to their peak, average, or rms amplitudes and the way in which that value might be determined and used by the system. It is also important to recognize that, at any instant, an AC signal has only one instantaneous value.

In most prior art cases the AC signal is rectified and a DC voltage, proportional to the AC signal, stored on an integrating capacitor. The process is generally described as 'peak detection' or 'peak rectification' but for practical reasons the derived DC value will generally lie somewhere between the rectified average and true peak value of the sine wave signal.

This process requires the detection of multiple sinusoidal peaks, followed by a filter having sufficient time-constant to maintain the "peak" voltage between signal peaks. In a 60 Hz system, each peak occurs at 16.7 ms intervals (20 ms for a 50 Hz system). The charging or the discharging of the integrating capacitor will generally be characterized by the need to select a fixed charge or discharge time constant. If a filter time-constant of say 5 times the signal repetition rate is required, then the response time of the output signal from the peak rectifier and filter is of the order of some 80 to 100 ms.

Further, noise or other effects causing distortions of the nominal sine wave shape also requires processing of several cycles of the AC signal before any reasonably representative DC value can be derived.

Given that, for modern motors, the start circuit must power-up and respond within less that 400 ms (the typical time for the motor to reach approx. 80% of full speed), the delay produced by such an arrangement becomes unacceptable. Indeed this prior art principle teaches away from the current invention, which instead preserves the AC signals, and processes them in real-time, using both amplitude and phase information of the measured parameters.

U.S. Pat. No. 5,296,795 (1994) provides a representative example of a prior art control system using rectification of the sensed signals. In this arrangement the start winding voltage has, as its reference, the mains supply so the start winding is sensed using two resistive dividers, one for the voltage at each end of the start winding (R3/4 and R5/6), and the AC difference is then rectified (AMP 1) and the resulting DC value is stored on an integrating capacitor (C3) for use in the switching decisions. There is also an arrangement for detecting the amplitude of the mains (BUF 1) that is based on resistive attenuation (R3/4) of that AC voltage followed by conventional 'peak' rectification with the resultant DC stored on an integrating capacitor (C4). That DC value becomes one parameter that will also be used in determining the switching decisions.

Therefore there still remains a need in the field of induction motors to provide an improved start switch device arrangement of the motor start circuit for it to better serve the purpose of controlling the applied voltage or current flow through the start winding.

Accordingly it is an object of this invention to provide a motor start circuit for an induction motor with a main winding and a start winding, which are supplied with alternating current or voltage from a mains power supply, with such an improved start switch device control arrangement.

Further objects and advantages of the invention will become apparent on the complete reading of this specification.

SUMMARY OF THE INVENTION

Accordingly in one form of the invention although this need not be the only nor indeed the broadest form the invention there is provided a motor start circuit for an induction motor with a main winding and a start winding, which are supplied with alternating current or voltage from a mains power supply, and with a start switch device serving the purpose of interrupting the voltage or current flow through the start winding after the start of the motor, the start switch device being connected to a control arrangement, said control arrangement including:

- a sensor system for monitoring at least two AC signals of said motor start circuit, wherein each monitored AC signal is being sensed with respect to a single selected reference point;
- a signal pre-conditioning arrangement comprising a plurality of impedance devices that adjusts the magnitude and phase of the monitored AC signals
- a signal adding arrangement wherein the monitored AC signals are added each to the other to form a single combined AC signal;
- a signal pre-conditioning arrangement comprising a plurality of impedance devices that adjusts the magnitude and phase of a reference AC signal derived from the AC mains;
- a first comparator adapted to accept the combined AC signal for comparison in instantaneous magnitude with the reference AC voltage derived from the mains supply and to output a signal having its instantaneous magnitude and polarity proportional to the difference between the input signals;
- an integrator adapted to filter the output signal from the first comparator to a corresponding output DC signal; and
- a second comparator adapted to compare the output DC signal from the said integrator with a reference DC input wherein response to those predetermined differences in DC inputs provides an output signal that controls the start switch device.

In one embodiment of the invention, in preference the motor start circuit is for a single-phase AC capacitor start induction motor.

In preference a start capacitor and the starting switch device are connected in series about respective sides of the start winding.

In preference the signals from each end of the start winding are pre-conditioned using impedance devices in electrical communication with the other to scale and phase shift these two sensed AC signals.

The start switch device should preferably be chosen so that when it is closed there is no only minimal voltage across said start switch device.

In preference the impedance devices includes a first attenuator network to adjust the magnitude and phase shift of a reference signal derived by sensing the AC mains supply. This reference will be applied to the first comparator.

In preference the impedance devices include a second attenuator network that receives and adjusts the magnitude and phase of the sensed AC signals from each end of the start winding. When the start switch device is closed the second attenuator network receives a sensed AC voltage equal to the voltage across the energized start winding. When the start switch device is open and there is negligible current flowing in the start capacitor and start winding then the AC voltage across the start capacitor is zero so the second attenuator network then receives a second sensed AC signal equal to the mains supply voltage plus the open circuit voltage across the de-energized start winding. Its first sensed AC signal, now the start switch is open, changes to become simply equal to the AC mains voltage.

In preference an adding device receives and combines those two pre-conditioned signals derived from each end of the start winding.

In preference the first comparator is an integrating comparator that controls an integrating capacitor that outputs to the second comparator a signal with magnitude and polarity directly proportional to an instantaneous difference in magnitude between the two AC input signals whereby when the input AC signals are in phase and equal in magnitude then said first comparator provides an output signal of zero volts and/or current whereas when the AC input signals are equal in magnitude and are 180 degrees out of phase then first comparator provides an output sine wave signal with a peak to peak amplitude proportional to the peak to peak amplitudes of the applied signals with the same frequency as the input AC signals.

In preference the start switch device is a triac that controls the supply of alternating current or voltage to the start winding thereby enabling the connection or disconnection of the start winding from the mains supply.

In preference the first comparator is adapted to be responsive to input currents so the AC signal preconditioning required when the triac is ON may be achieved using a phase shift from the AC mains supply reference signal that includes a resistor in series with a capacitor along the input signal path to said first comparator.

In preference when the triac is OFF a resistor and a series capacitor, for also removing any unwanted DC signal component remaining on the start capacitor, is included in the input signal path that senses the voltage across the OFF triac to provide a phase lead for the signal sensed across the OFF triac.

In a further embodiment of the invention the motor start circuit is for a single-phase AC resistive start induction motor.

In preference further including an amplifier as part of the pre-conditioning network used to monitor the current in the main winding by measuring the voltage across a current sensing resistor.

In preference the sensing resistor has a rating of 1 to 80 milliohms to provide an AC sensed voltage amplitude between 100 to 500 millivolts.

In preference the amplifier provides gain and in combination with the pre-conditioning network adaptability to modify the AC signal representing the motor run winding current applied to the signal adding arrangement.

In preference to allow removal of any spurious noise and any remaining mains related AC signal components, the comparator output will include an integrator. This integration capacitor will be selected to achieve the fastest possible response time consistent with a designed level of rejection of unwanted noise. An important feature of the integrator is that it will not have any fixed time constant associated with its charging or discharging. Instead the comparator's output drive current, determining the charge/discharge time, will be proportional to the instantaneous difference in magnitude between the AC signals that are being compared. The response time of the system, no matter whether an input level is increasing or decreasing with respect to the chosen reference level, will be inversely proportional to the difference in their instantaneous magnitudes.

The conventional requirement for hysteresis on the DC comparator has been replaced by using an arrangement that senses an additional AC system parameter and then sums those two sensed AC signals at, or prior to, comparison with an AC reference parameter.

The invention will now be described in greater detail through its preferred embodiments with the assistance of the following illustrations and text.

BRIEF DESCRIPTION OF ILLUSTRATIONS

DETAILED DESCRIPTION

The following brief outline highlights the differences in system arrangement and AC signal handling between this invention and the typical prior art systems. Where example values are quoted for relative voltage or current amplitudes these will vary with the motor construction but will follow a very similar pattern.

Figure 1A:
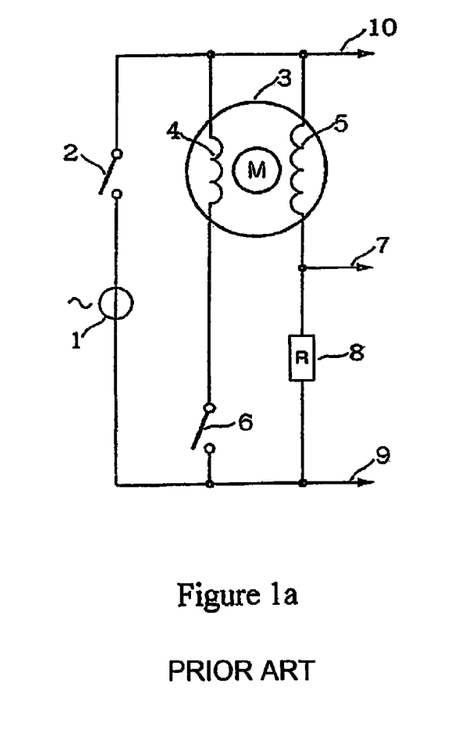
FIGS. 1a and 1b show prior art motor start circuits for both resistive and capacitive start induction motors. (PRIOR ART).
Figure 1B:
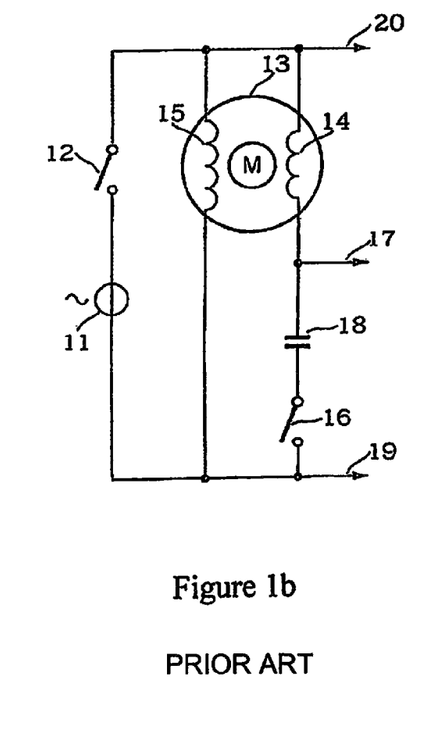

FIGS. 1a and 1b show the typical arrangement of the main and start windings as found in the prior art. FIG. 1a shows the arrangement used for a resistive-start motor 3, where the start winding 4 is controlled by a switch 6, The current in the main winding 5 is monitored by a current sensing resistor 8, providing an AC voltage between 7 and 9, which is proportional to main winding current.

The motor 3 (13) has main winding 5 (15) and start winding 4 (14) and is powered by a mains supply 1 (11) via an on/off switch 2 (12). Closing switch 6 (16) energizes the start winding directly or via a start capacitor 18. Resistor 8 is included only to provide a signal voltage proportional to the current in the start winding. Typically only a single circuit parameter 7 (17) is monitored as a measure of motor speed, by comparing with reference voltage 9 (19) or 10 (20).

FIG. 1b shows the typical arrangement for a capacitor-start motor. The circuit for the start winding 14 of the capacitor-start motor 13 is normally connected via start capacitor 18 and the control switch 16. Typically the voltage across the start winding 14 is monitored by measuring the voltage between points 17 and 20. Capacitor-start systems sensing main winding current rather than start winding voltage have also been described.

It has been noted that in all prior art cases, the two motor windings always share a common terminal, for example points 10 in FIG. 1a or 20 in FIG. 1b, that is connected to either the mains active or mains neutral while the remaining connections complete the supply path to the main winding and to the start winding via the switching device and a series start capacitor when applicable. The sensing in these arrangements uses one side of the mains supply, point 10 or 20, as its common reference, and only one voltage is being sensed in each case.

Components corresponding with those in FIGS. 1a and 1b are numbered with an increase of 20, so the motor becomes 23 or 33 etc. and a similar numbering convention is also followed in other figures. In this case two circuit parameters 27 (37) and 30 (40) are used as a measure of motor speed.

Figure 3:
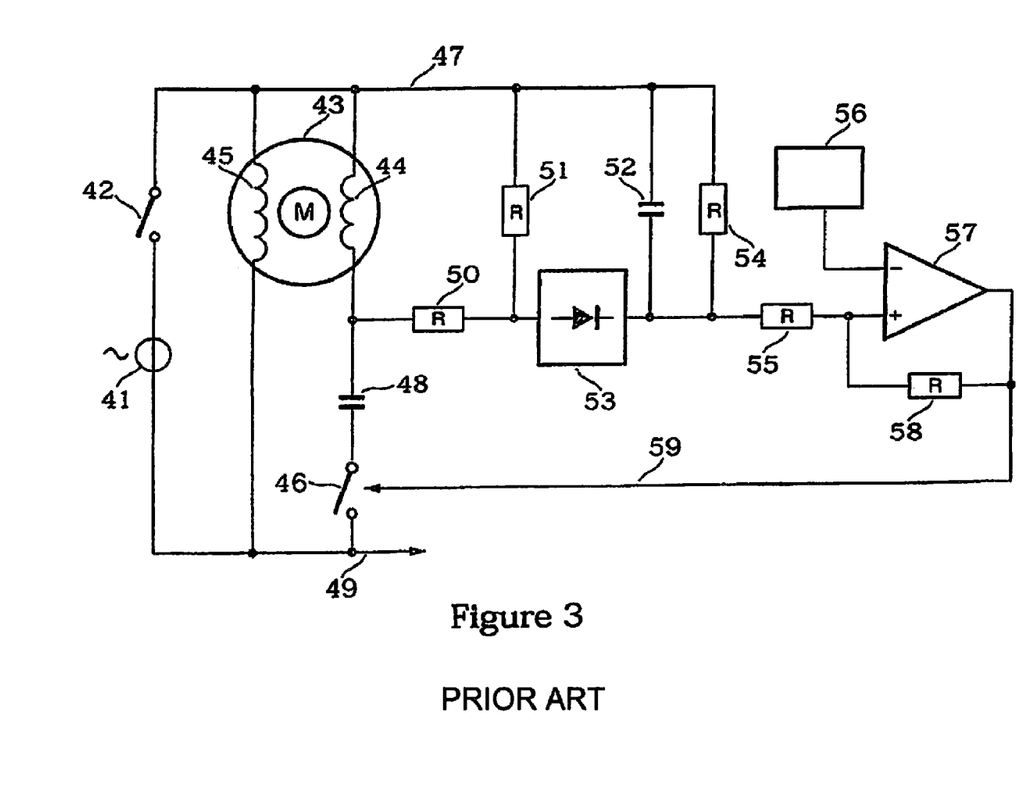
FIG. 3 shows a circuit diagram for the control of a start switch device for a capacitive start AC induction motor from the prior art. (PRIOR ART)

FIG. 3 shows the basic function blocks in a typical prior art system. When the on/off switch 42 is closed to apply power to the motor 43, and before the motor starts rotating, the amplitude of the voltage developed across the energized start winding 44 of a capacitor start motor will typically be much less than the nominal mains voltage, usually around 80% of nominal mains voltage. In the case of a resistive start motor 93 in FIG. 5 the current in the main winding 95 will have its maximum or 'locked rotor' value. These values then change as the motor accelerates.

The sensing arrangement shown in prior art FIG. 3 must ensure that when the motor is about to start the sensed parameters fall within the range that causes the control system to close the start switch 46 in order to activate the start winding and achieve a high starting torque. As the motor accelerates the current in the main winding of a resistive start motor decreases while the voltage across the start winding of a capacitor start motor increases and usually will exceed the nominal mains voltage.

It is conventional and desirable to disconnect the start winding when the motor speed has reached about 80% of its synchronous speed. At that speed a typical value for the voltage on the start winding 44 of a capacitor start motor will be about 140% of nominal mains voltage while the current in the main winding 95 of a resistive start motor 93 in FIG. 5 will have decreased to about 80% of its locked rotor value.

In the capacitor start case, when the control system disconnects the start winding and its activating current via the series capacitor 48 ceases, the voltage across the start winding will almost immediately fall to a level around 80% of the nominal mains voltage. As the motor continues to accelerate to its final speed that open circuit winding voltage will then rise again to a maximum amplitude that is slightly above the mains voltage but still considerably below the voltage on the winding just before disconnection while it was activated.

If the motor slows due to a temporary increase in mechanical loading or interruption to the mains power then it is desirable to reconnect the power to the start winding to again accelerate the motor to its correct speed. A conventional/desirable speed for reconnection is about 50% of synchronous speed and the open circuit voltage across the start winding of a capacitor start motor at that speed is about 33% of the nominal mains voltage.

clear that the relative voltage levels appearing across In a typical prior art arrangement of a capacitor start motor, FIG. 3, where the scaled and rectified voltage across capacitor 52 simply reflects the sensed AC winding voltage, it will be the capacitor 52 will therefore have the following relative values. The values are relative to an assumed mains voltage= 1 unit. (Prior Art)

|  | UNITS |
|---|---|
| a) When power is first applied and before the motor turns. | 0.80 |
| b) When the motor has accelerated to the wanted disconnection speed. | 1.41 |
| c) Immediately after the start winding is de-energized. | 0.84 |
| d) As the motor approaches operating speed (winding de-energized). | 0.95 |
| e) When the motor has slowed to the wanted reconnection level . . . | 0.33 |

Notice that when the start winding is disconnected its voltage falls below its energized value. That makes provision of hysteresis on the comparator 57 mandatory to avoid unstable behaviour because otherwise the fall in winding voltage after disconnection would cause it to be immediately reconnected, in turn causing the voltage to rise and leading to disconnection.

The control system would be oscillatory. In the prior art the hysteresis applied by resistors 55/58 will cause connection of the start winding if the capacitor 52 voltage falls below 0.33 units and disconnection when it rises above 1.41 units. Again note those levels are significantly different. That means the time for the capacitor to charge/discharge between those very different voltage levels is a factor that limits the relative speed of response of these prior art systems when compared with the system described in these claims.

It is now also important to note that while the mains reference and start winding voltages will have phase differences that fact is not relevant to the prior art arrangements, or even to the differential measurement technique used in prior art reference U.S. Pat. No. 5,296,795. In that patent the output of the rectifier (AMP 1) is not affected by that phase difference. It is simply responsive to the start winding voltage amplitude.

Further, after rectification to dc, any relative phase information from that winding is not available for possible use in any subsequent switching decisions. The rectified start winding voltage will only be compared with DC reference voltage levels derived from other parameters, including the AC mains voltage.

In the arrangement described in this patent two (or more) AC signals need to be compared in a very short time interval so it is necessary for their relative phasing to be included in the comparison process. The prior art process of rectification of AC signals to DC is not generally responsive to any relative phase information. It follows that if two such DC signals, derived from AC signals, are being compared, as in prior art systems, then the process cannot be responsive to phase information in the original AC signals and so will take a longer time.

Figure 2A:
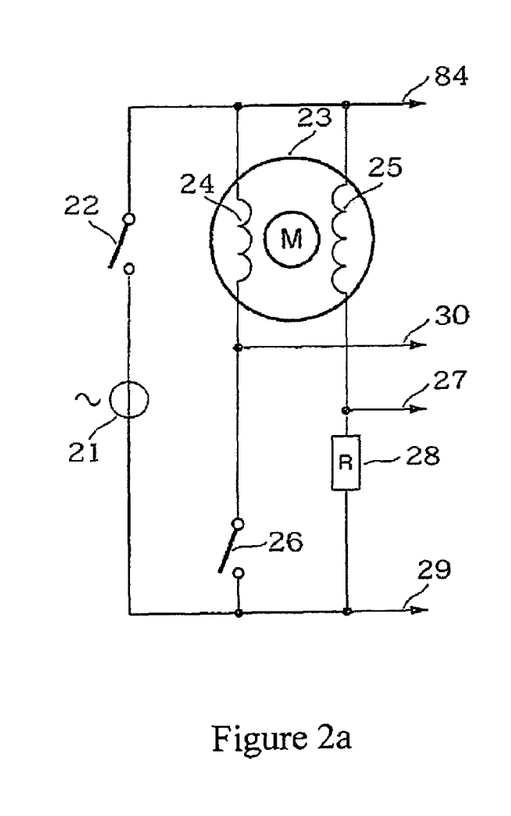
FIGS. 2a and 2b show preferred embodiments of a motor start circuit for both resistive and capacitive start induction motors.
Figure 2B:
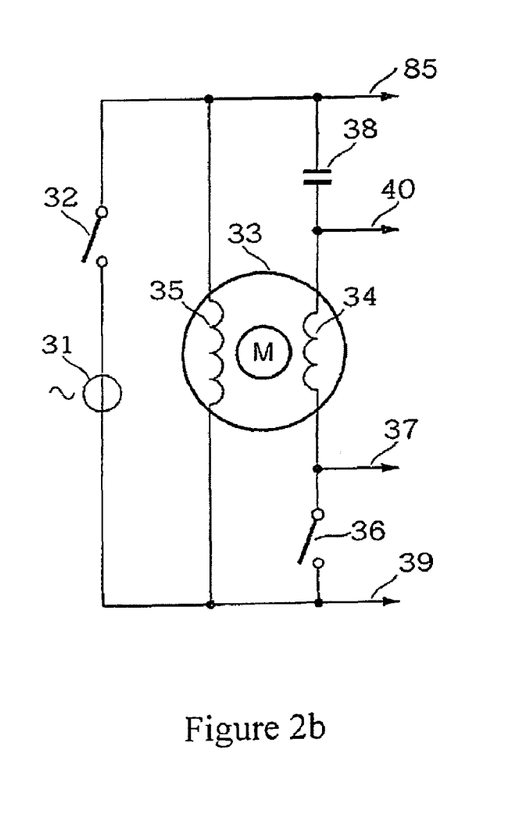
Figure 4:
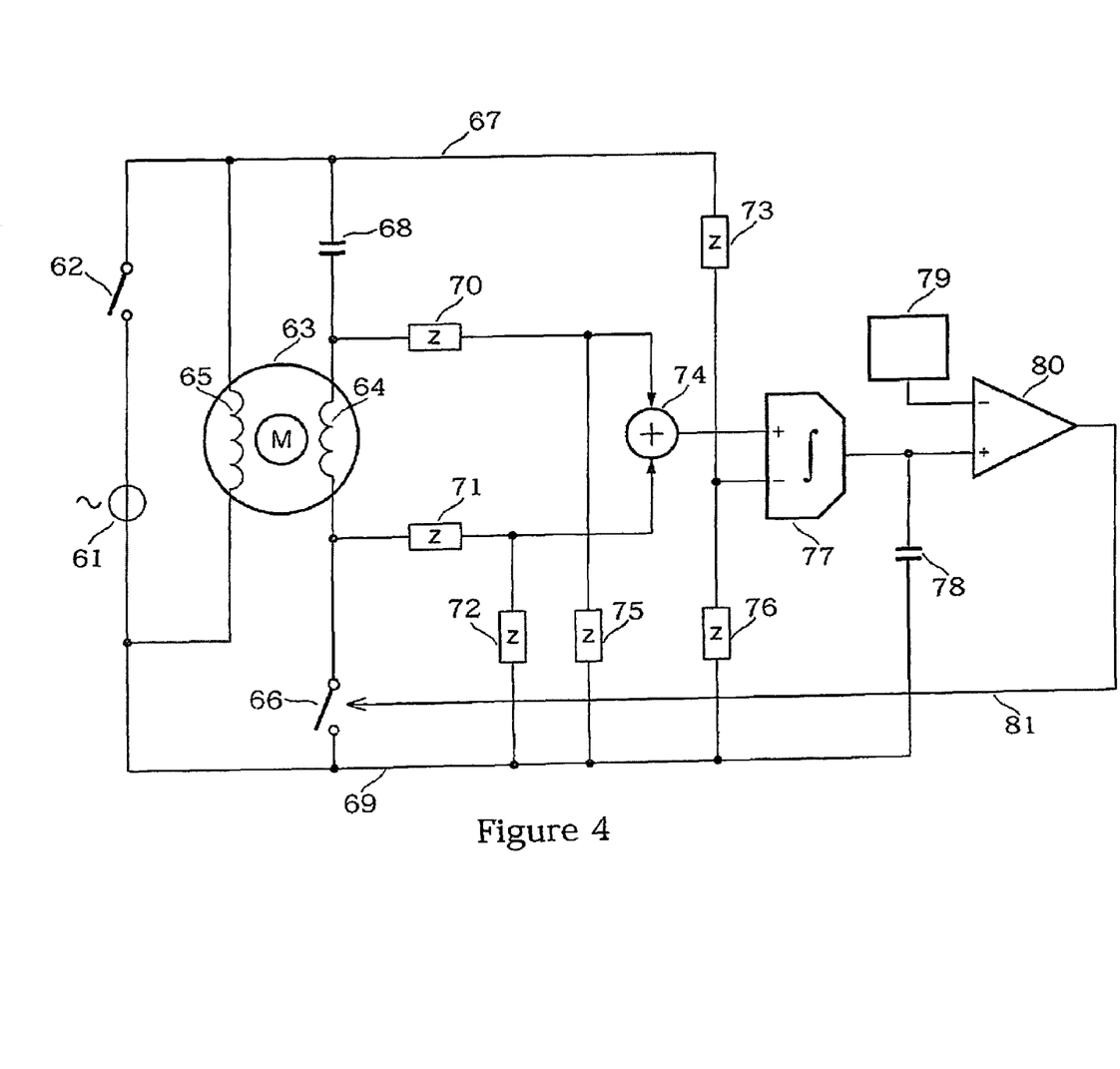
FIG. 4 shows the circuit arrangement for the control of a start switch device in a preferred embodiment of this invention for use with a capacitive start AC induction motor.
Figure 5:
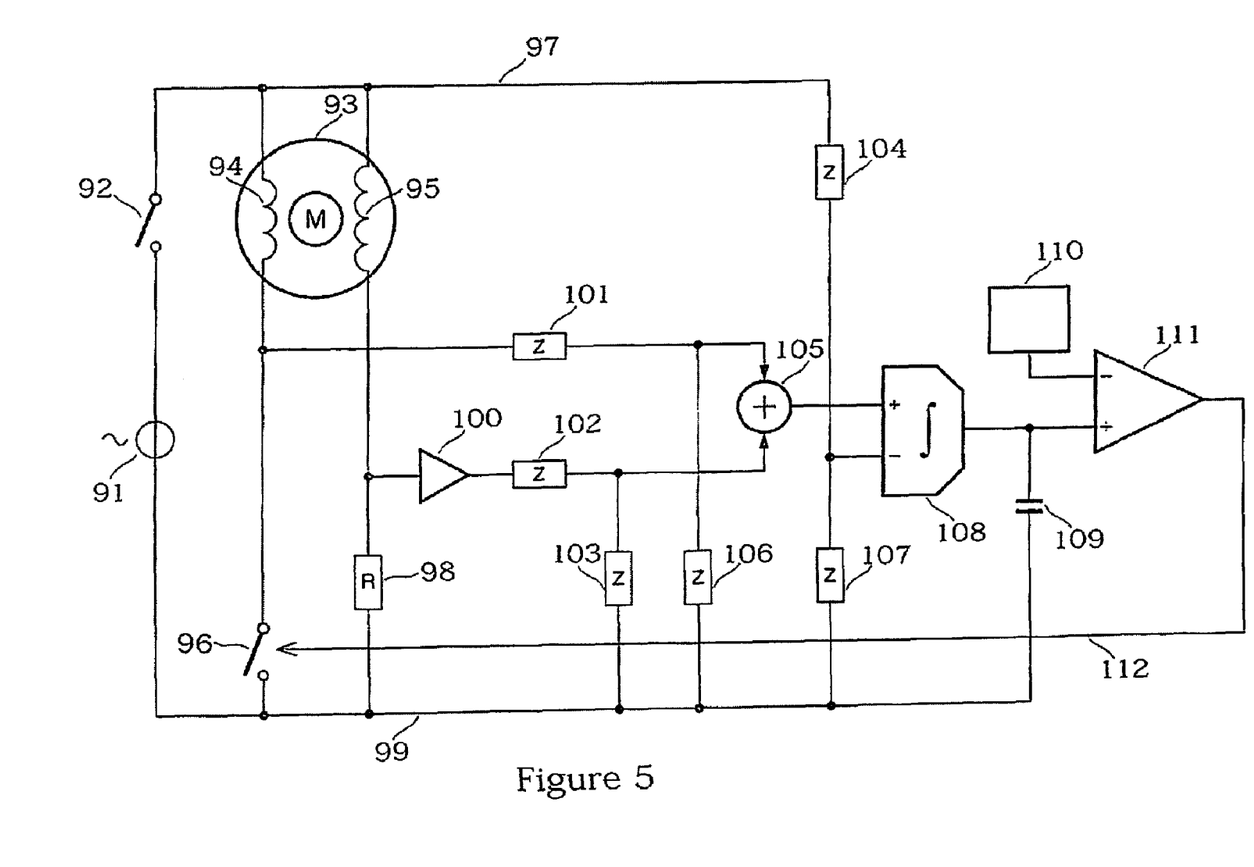
FIG. 5 shows the circuit arrangement for the control of a start switch device in a preferred embodiment of this invention for use with a resistive start AC induction motor.

In the new arrangements shown in FIG. 2a, FIG. 2b or FIG. 5, when compared with the prior art arrangements FIGS. 1a and 1b, it can be seen that the number of points in the system at which voltages or currents are being sensed has been increased by one. For example, in the example of prior art FIG. 1b there is just one AC parameter 17 being sensed with respect to a selected reference node 19. In the improved arrangement in FIG. 2b there are two AC signals 37 and 40 being sensed with respect to the selected reference node 39. Those two signals will be combined, for example summed as shown in FIG. 4, to form one AC signal that will next be compared with a reference, in a manner similar to prior art, but with a significant difference in the comparator arrangement.

The voltage across the start winding 44 is attenuated by a resistive divider 50 51, rectified 53 and filtered by capacitor 52 having a discharge time set by resistor 54. Comparator 57 with hysteresis set by 55 58 has a reference 56 and outputs a control signal 59 that activates the switch 46.

FIG. 4 illustrates the different arrangement claimed in this invention for capacitor start motors.

Signals across the start winding 64, start switch 66 and the mains reference 67 can be attenuated and phase shifted as required using complex impedances 70, 75, 71, 72, 73, 76 that replace the prior art resistive dividers. The 'pre-conditioned' AC signals are summed at 74 and compared using a special comparator 77 to be described, filtered on capacitor 78, compared using comparator 80 with a reference 79, and control the switch 66.

It can be seen that the series connection of the start capacitor 68, the motor start winding 64 and the start switch 66 has been re-arranged such that the switch 66 and capacitor 68 are placed on opposite sides of the start winding 64.

The signal pre-conditioning arrangement uses complex impedances 70, 71, 72 and 75 to scale and phase shift the signals from the start winding 64 and the start switch 66. When the start switch 66 is closed there is no voltage across that switch and the voltage across the start winding 64 is being sensed in a conventional way and has the same magnitude as in the prior art configuration. However the key difference lies in the provision, in the attenuators, of complex impedances to adjust the phase shift of the sensed AC signal from the start winding relative to the phase of the AC mains reference signal applied to the comparator.

A second important difference is the addition of the additional sensing path that becomes active when the start switch is opened. The voltage across the start switch 66, which has a magnitude closely equal to the mains voltage 67 plus the open circuit voltage across the start winding 64, is preconditioned in magnitude and phase by a second attenuator network 71, 72 and then summed in a simple summing device 74 with the original signal from the network 70, 75 that sensed the start winding 64. Note however that when the start switch 66 is open and there is negligible current flowing in the start capacitor 68 and start winding 64 then the AC voltage across the start capacitor 68 is essentially zero so the first sensing network 70, 75 now supplies a signal to the summing device 74 that is simply proportional to the mains supply voltage at 67.

The output of the summing device 74 is next compared in magnitude with a reference voltage derived from the mains voltage 67. A pre-conditioning network comprising complex impedances 73 and 76 adjusts the magnitude and phase of that mains reference relative to the signal from the summing device 74.

The integrating comparator 77, controls an integrating capacitor 78, and will output to comparator 80 a DC signal with magnitude and polarity directly proportional to the instantaneous difference in magnitude between the two AC input signals.

Here it is important to note that if the applied AC signals are in phase and equal in magnitude then the output of this comparator will be zero. If the two signals are equal in magnitude but are 180 degrees out of phase then the output of the comparator will take the form of a sine wave signal with a peak to peak amplitude proportional to the peak to peak amplitudes of the applied signals and having the same frequency as the applied AC signals. While its average DC value may be zero there will be a large amplitude unwanted mains frequency ripple on the integrating capacitor.

It should now become clear why it is important to include "pre-conditioning" circuitry for adjusting the relative phase of the signals to be compared and how this arrangement recognizes and overcomes limitations inherent in the prior art.

As mentioned previously in the background of the invention this arrangement provides true integration of the instantaneous differences in the input signals rather than simple low pass filtering with a fixed cut-off frequency. The function of the integration capacitor could be described as providing a low-pass filter function with a variable cut-off frequency and therefore can provide a variable response time as discussed in more detail below.

The arrangement of FIG. 4 allows for separate adjustment of the scaling and phase of the signals that appear at the output of the summing device 74 for the two important conditions of the start switch 66, when open and when closed.

The arrangement following the integrating comparator (and associated capacitor) closely resembles the arrangement disclosed in the prior art but there is a very significant difference that can be illustrated by an example.

That important difference is that, by suitable choice of the three preconditioning networks shown 70/75, 71/72, 73/76, the resulting output signal on the integration comparator 77 will be driven, at the opening/closing of the start switch 66, in a direction that reinforces the switching decision. That is, the requirement for provision of hysteresis on the following conventional DC comparator 80 has been removed. Hysteresis may still be useful here but any reasons for its application will be very different. Typically, hysteresis here can provide a designed level of tolerance to mains frequency ripple or mains related transients that affect the integrator's output.

The relative signal levels out of the summing arrangement 74, as compared with the prior art start winding voltage can be arranged to become approximately.

(Wherein INV=this invention, PA=Prior Art)

|  | INV/PA UNITS |
|---|---|
| a) When power is first applied and before the motor turns. | 0.9/0.8 |
| b) When the motor has accelerated to the wanted disconnection speed. | 1.0/1.41 |
| c) Immediately after the start winding is de-energized. | 1.11/0.84 |
| d) As the motor approaches operating speed. | 1.15/0.95 |
| e) When the motor has slowed to the wanted reconnection level. | 1.0/0.33 |
| f) Immediately after reconnection level at the slow speed . . . | 0.95/0.95 |

Two important differences are that there are no large changes in amplitude of the signal from the summing arrangement input to the integrating comparator 77, so its output does not need to change in magnitude by large amounts, and that the cut out and cut in levels are essentially equal meaning there is no need for hysteresis on the following DC comparator 80. That allows the use of a relatively short integration time on the integrating capacitor and in turn allows significantly faster response times.

That faster response time is again assisted by the use of a comparator design 77 that charges the integrating capacitor in a direction dependent on, and proportional to, the differences in instantaneous input signal magnitude.

The provision of an arrangement to pre-adjust the relative phase of the AC signals being compared minimizes the ripple signal on the integrating capacitor and allows a much shorter integration time, again allowing for a faster system response.

As indicated, if the AC signals being compared have a phase difference of 180 degrees then the output of the integrating comparator 77 exhibits maximum ripple at the mains frequency. It will be immediately obvious that if that were the case a simple inversion of one signal would minimize that ripple. Therefore the 'worst case' for phase difference between the input signals will be 90 degrees. In practice the signals being compared have a phase difference less than 90 degrees but still sufficient to cause significant ripple on the comparator output when compared with its wanted DC level that must be detected and used to cause the switching of the start winding 64.

In the case of a resistive start motor the sensed main winding current is preferably compared against a reference level derived from the AC mains voltage in order to eliminate the effects of variation in mains voltage (well known prior art).

The signal derived from the current in the inductive main winding will typically lag a reference derived from the mains voltage by about 40 degrees. Therefore one objective of the invention is to include phase shifting impedances that will minimize such phase differences before the signals are input to the comparator.

FIG. 5 shows how a variation on the improved arrangement in FIG. 4 can be applied to resistive start motors, illustrating how the advances in this invention can be used with either resistive-start motors or with capacitive-start motors. In the case of the resistive start motor in FIG. 5, an additional amplifier 100 is required as part of the pre-conditioning network used to monitor the current in the main winding 95 by measuring the voltage across a current sensing resistor 98. Because the typical start current in the run winding can be several 10's of amperes, a sense resistor of only a few milliohms is used to provide an AC sense voltage amplitude of several hundred millivolts. The amplifier provides gain and in combination with the pre-conditioning network 102/103, modifies the AC signal representing motor run winding current, which is then applied to the summing device.

FIG. 5 illustrates the use of preconditioning networks 101/106, 102/103, and 104/107 to modify the phase difference between the AC signals as input to the integrating comparator 108 because that can minimize the ripple on the integrating capacitor 109 and achieve the required speed and accuracy necessary to work with modern motors. A signal derived from the voltage across the start switch 96 is added to the signal derived from the main winding current sensor 98 in order to adjust the motor speeds at which the start switch 96 will open and close again and to eliminate the need for hysteresis on the second comparator 111. In this way, as also described in the case of capacitor starting, the speed and accuracy of this control system is greatly improved. This arrangement also illustrates the applicability of the phase adjustment networks and AC comparison principles to conventionally connected start and main windings because here they do share the common connection point 97 as found in all prior art.

The start switch voltage is preconditioned on complex impedances 101 106 and added on 105 to a signal that senses the main winding current using resistor 98, amplifier 100, and preconditioning impedances 102 103. The resulting AC signal is compared on special comparator 108 with a signal sensing the mains 97 and preconditioned using impedances 104 107. Filter capacitor 109 voltage is processed by 111 and 110 as in FIG. 4.

Figure 6:
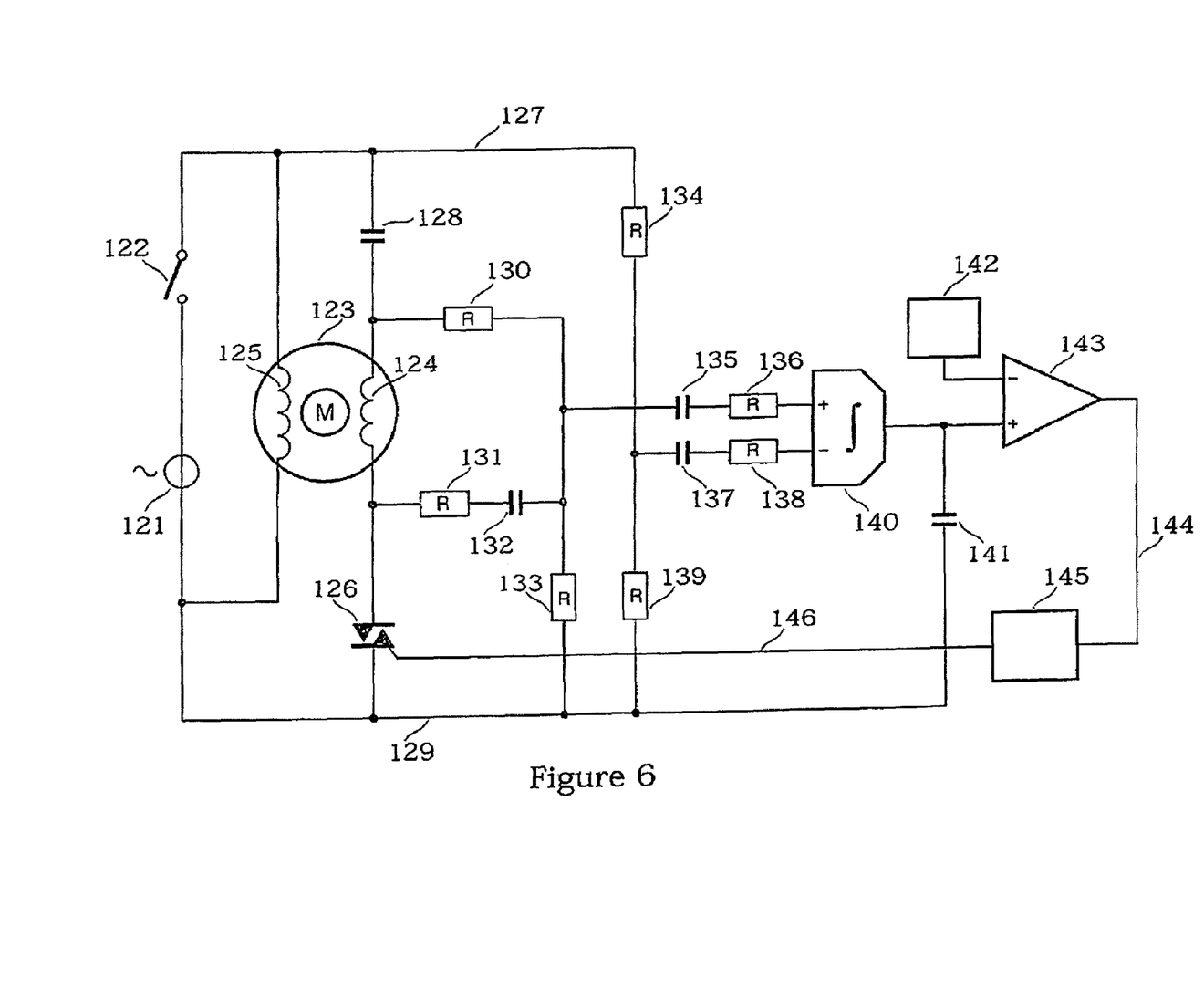
FIG. 6 shows a further circuit used to control capacitor-start motors.

FIG. 6 shows an example of the practical arrangement used to control capacitor-start motors. Signal attenuating networks 130/133 and 134/139 firstly scale the sensed and reference signals.

The AC integrator 140 is responsive to input currents so the phase shift required when the triac 126 is on is achieved using a phase shift (lead) in the AC mains reference path provided by capacitor 137 and resistor 138. When the triac 126 is OFF resistor 131 and capacitor 132 sensing the triac voltage will provide a phase lead. Capacitor 135 does not provide any significant phase shift but is included because there will be a large unwanted DC signal component retained on the start capacitor 128 when the triac 126 switches OFF and this is preferably removed from the AC signal before being processed in the AC integrating comparator 140. The signal on filter capacitor 141 is further processed as in FIG. 4 or 5 using a reference 142 and comparator 143 to generate a signal that controls generation of triac gate pulses by 145.

This is effectively that same as the circuit in FIG. 4, with the complex impedances of FIG. 4 being replaced with actual resistor and capacitor equivalents, as applied in this circuit. In addition the functional block 145 is simply required to provide appropriate gate pulse timing and synchronisation to triac switch 126.

Figure 7:
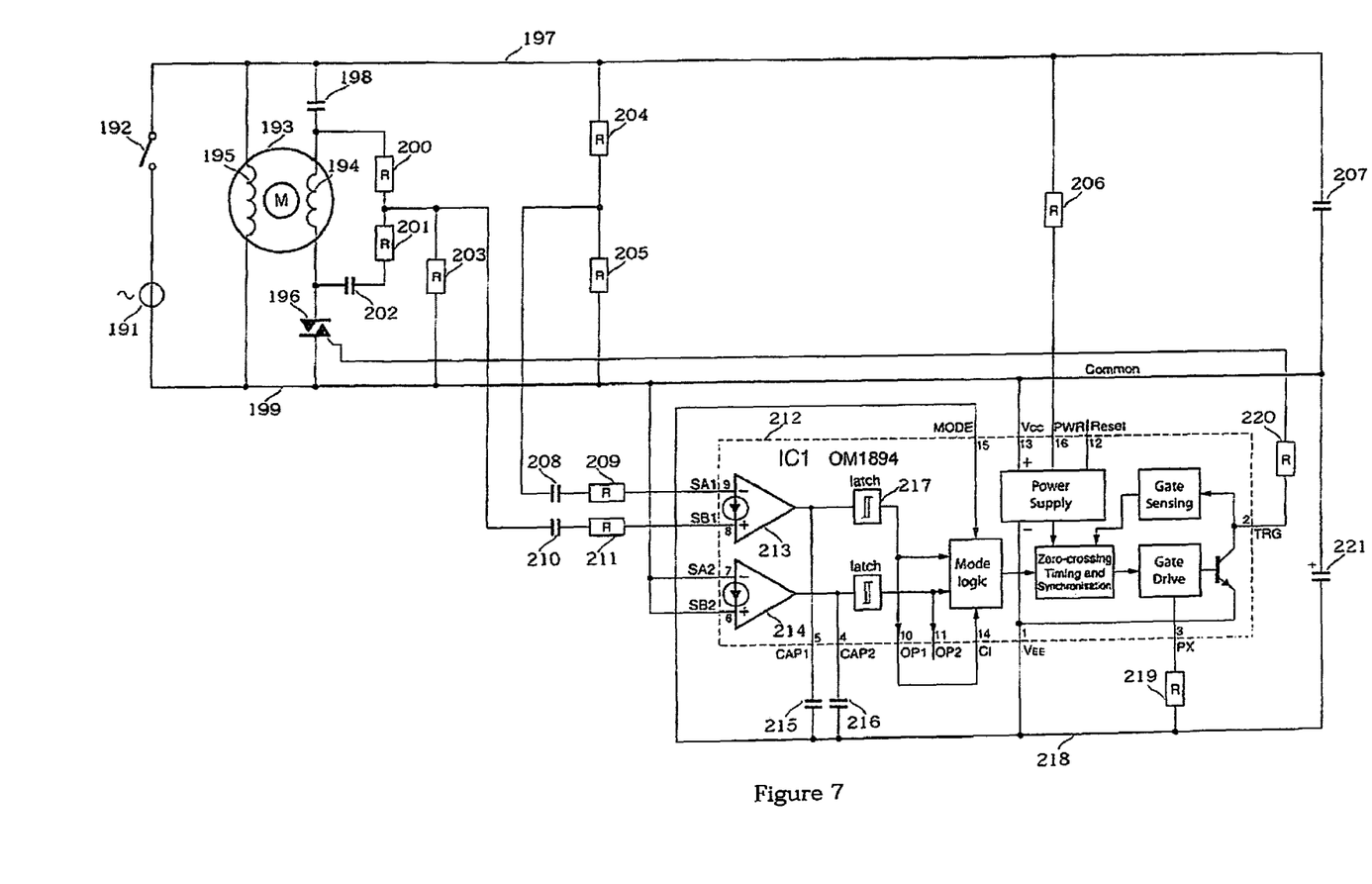
FIG. 7 shows a further, more detailed circuit used to control capacitor-start motors.

FIG. 7 shows the complete final circuit of the invention for application with a capacitor-start motor. The configuration of the sensing networks 200 201 202 203 around the motor 193, mains attenuator 204 205, and impedances 208 209 210 211 are the same as discussed earlier for simplified diagram of FIG. 6. This implementation uses an existing integrated circuit 212, which provides some of the key functional blocks described earlier, in particular the integrating comparator 213 with associated filter capacitor 215. This provides an output DC voltage on filter capacitor 215 with magnitude and polarity directly proportional to the instantaneous difference in magnitude between the two AC input signals at SA1 and SB1.

Latch 217 provides a DC comparator function. While the latch includes hysteresis, this is only to prevent uncertain switching in the event of slowly changing output voltage of integrating comparator 213. It is not required to ensure stability of the total system. Other associated circuitry within the integrated circuit 212 is used to provide suitable gate pulses to control the triac switch 196. There are numerous ways of controlling a triac, and the method used here is not critical to the invention. The IC 212 contains dual signal processing capability 214 216 that is not relevant to this patent. It uses a supply capacitor 221 and resistor 206 and components 219 220 to adjust the triac gate drive. Capacitor 207 may be required across the AC mains supply to suppress RFI.

The values of the components in the pre-conditioning networks (200, 201, 202, 203, 204, 205, 208, 209, 210, 211) will be very much dependent on the actual motor used, and the characteristics of the start winding 194 and associated capacitor 198.

Figure 8:
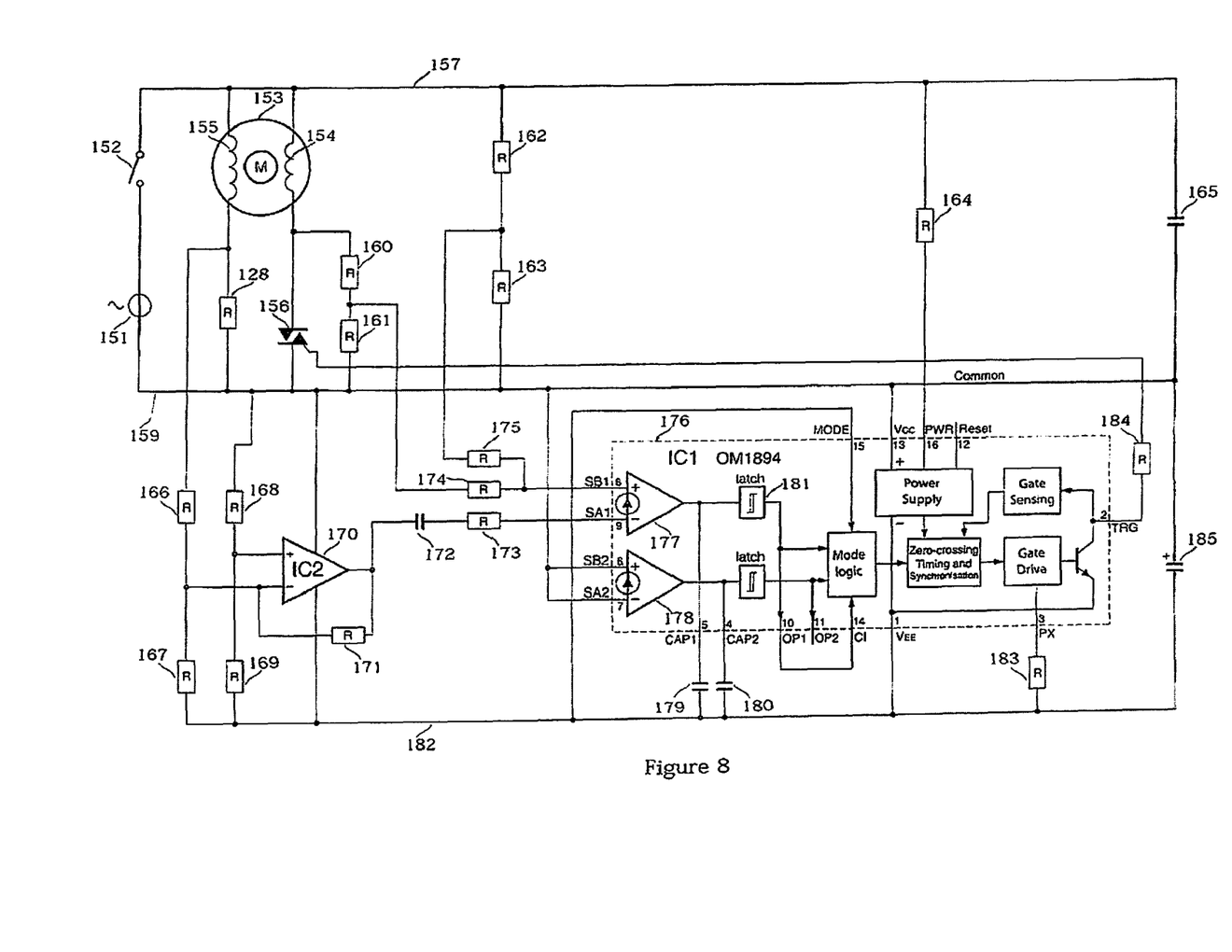
FIG. 8 shows a further, more detailed circuit used to control resistive-start motors.

FIG. 8 shows the complete final circuit of the invention for application with a resistive-start motor. This is slightly more complex compared with the capacitor start application, mainly due to the requirement to amplify, using operational amplifier 170 together with biasing and gain setting resistors 166 167 168 169 and 171, the very small voltage measured across the current sense resistor 128 used to monitor the current in the motor run winding 155 during start up (as was introduced above in describing FIG. 5). The signal across the triac (start switch) 156 is attenuated using resistors 160 161 and added to a fraction of the AC mains voltage 157 using resistors 162 163 174 175 and compared using IC 176 with the (amplified) signal from the main winding current sensor 128 that is phase shifted using 172 173. Processing of the DC signal across capacitor 179 to control triac 156 is then the same as for the signal on capacitor 215 in FIG. 7 and not relevant to this patent.

The claims defining the invention are as follows:

1. A motor start circuit for an induction motor with a main winding and a start winding, which are supplied with alternating current or voltage from a mains power supply, and with a start switch device serving the purpose of interrupting the current or voltage flow through the start winding after the start of the motor, the start switch device being connected to a control arrangement, said control arrangement including:
   a sensor system for monitoring at least two AC signals of said motor start circuit, wherein each monitored AC signal is being sensed with respect to a selected reference point;
   a signal adding arrangement including a signal pre-conditioning arrangement comprising a plurality of impedance devices that can adjust the magnitude and phase of the monitored AC signals to be added each to the other for a single combined AC signal;
   a first comparator adapted to accept the combined AC signal for comparison in instantaneous magnitude with an AC reference voltage derived from the mains supply wherein a pre-conditioning arrangement comprising a plurality of impedance devices can adjust the magnitude and phase of that mains reference relative to the combined AC signal;
   an integrator adapted to filter the output signal from the first comparator to a corresponding output DC signal; and
   a second comparator adapted to compare the output DC signal from the said integrator with a reference DC input wherein response to those predetermined differences in DC inputs provides an output signal that controls the start switch device.

2. The motor start circuit of claim 1 for a single-phase AC capacitor start induction motor.

3. The motor start circuit of claim 2 wherein a start capacitor and the starting switch device are connected in series about respective sides of the start winding.

4. The motor start circuit of claim 3 wherein the signal pre-conditioning arrangement includes impedance devices to scale, phase shift and combine AC signals sensed at each end of the start winding.

5. The motor start circuit of claim 4 wherein the impedance devices include a first attenuator network to attenuate and adjust the phase shift of the reference signal derived from the sensed AC mains supply relative to the phase of the combined AC signal from the start winding as applied to the first comparator.

6. The motor start circuit of claim 5 wherein the signal adding arrangement includes a second attenuator network that receives a signal from the energized start winding when the start switch device is closed.

7. The motor start circuit of claim 6 wherein the signal adding arrangement includes a third attenuator network that receives a signal when the start switch device is opened.

8. The motor start circuit of claim 7 wherein the first comparator is an integrating comparator that controls an integrating capacitor that outputs to the second comparator a signal with magnitude and polarity directly proportional to the instantaneous difference in magnitude between the two AC input signals and whereby when the input AC signals are in phase and equal in magnitude then said first comparator provides an output signal of zero volts and/or current whereas when the AC input signals are equal in magnitude and are 180 degrees out of phase then first comparator provides an output sine wave signal with a peak to peak amplitude proportional to the peak to peak amplitudes of the applied signals and with the same frequency as the input AC signals.

9. The motor start circuit of claim 8 wherein the start switch device is a triac that controls the supply of alternating current or voltage to the start winding thereby enabling the connection or disconnection of the start winding from the mains supply.

10. The motor start circuit of claim 9 wherein the first comparator is adapted to be responsive to input currents so the AC signal preconditioning required when the triac is ON may be achieved using a phase shift from the AC main supply reference signal that includes a resistor in series with a capacitor along the input signal path to said first comparator.

11. The motor start circuit of claim 10 wherein, when the triac is OFF, a resistor and a series capacitor, for also removing any unwanted DC signal component remaining on the start capacitor, is included in the input signal path to provide a phase lead.

12. The motor start circuit of claim 1 for a single-phase AC resistive start induction motor.

13. The motor start circuit of claim 12 further including an amplifier as part of the pre-conditioning network used to monitor the current in the main winding for amplifying the voltage across a current sensing resistor.

14. The motor start circuit of claim 13 wherein the sensing resistor has a rating of 1 to 80 milliohms to provide an AC sensed voltage amplitude between 100 to 500 millivolts.

15. The motor start circuit of claim 14 wherein the amplifier provides gain and in combination with the pre-conditioning network adaptability to modify the AC signal representing the motor run winding current applied to the signal adding arrangement.

* * * * *